US00RE50397E

(19) United States
(12) Reissued Patent
Choi et al.

(10) Patent Number: US RE50,397 E
(45) Date of Reissued Patent: Apr. 22, 2025

(54) BATTERY PACK

(71) Applicant: SAMSUNG SDI CO., LTD., Yongin-si (KR)

(72) Inventors: Jiyeon Choi, Yongin-si (KR); Jongchan Han, Yongin-si (KR); Giyoung Kim, Yongin-si (KR)

(73) Assignee: SAMSUNG SDI CO., LTD., Yongin-si (KR)

(21) Appl. No.: 17/325,546

(22) Filed: May 20, 2021

Related U.S. Patent Documents

Reissue of:
(64) Patent No.: 10,298,030
Issued: May 21, 2019
Appl. No.: 15/212,319
Filed: Jul. 18, 2016

(30) Foreign Application Priority Data

Jul. 20, 2015 (KR) ..... 10-2015-0102402

(51) Int. Cl.
*H02J 7/00* (2006.01)
*H01M 10/42* (2006.01)
*H01M 10/44* (2006.01)
*H01M 10/48* (2006.01)

(52) U.S. Cl.
CPC ..... *H02J 7/0031* (2013.01); *H01M 10/425* (2013.01); *H01M 10/44* (2013.01); *H01M 10/48* (2013.01)

(58) Field of Classification Search
CPC .... H01M 10/425; H01M 10/44; H01M 10/48; H02J 7/0029; H02J 7/0031; Y02E 60/10
See application file for complete search history.

(56) References Cited

U.S. PATENT DOCUMENTS 8,305,045 B2 11/2012 Maeagawa
9,979,220 B2 * 5/2018 Jung ..... H02J 7/007
2011/0228436 A1 9/2011 Lee et al.
(Continued)

FOREIGN PATENT DOCUMENTS

JP 2013-153614 A 8/2013
KR 10-2010-0054294 A 5/2010
(Continued)

OTHER PUBLICATIONS

Korean Office action dated Feb. 24, 2022.

*Primary Examiner* — Woo H Choi
(74) *Attorney, Agent, or Firm* — Lee IP Law, P.C.

(57) ABSTRACT

A battery pack includes a battery, a terminal unit, a first current path, a second current path, and a first voltage sensing path. The battery has first and second battery terminals. The terminal unit includes a first pack terminal, a second pack terminal, and a first sensing terminal. The first current path includes charging and discharging switches and is located between the first battery terminal and the first pack terminal. A charging current and discharging current of the battery flows on the first current path. The second current path is between the second battery terminal and the second pack terminal. The first voltage sensing path includes the first sensing terminal, and voltage between the first sensing terminal and another terminal corresponds to a voltage between the first battery terminal and the first sensing terminal.

23 Claims, 6 Drawing Sheets

(56) References Cited

U.S. PATENT DOCUMENTS

| | | | | |
|---|---|---|---|---|
| 2012/0032645 | A1* | 2/2012 | Matsuura | H02J 7/00304 320/134 |
| 2012/0274335 | A1* | 11/2012 | Matsuura | G01R 31/3842 324/537 |
| 2013/0050891 | A1* | 2/2013 | Tanaka | H02H 7/18 361/101 |
| 2013/0193924 | A1 | 8/2013 | Kurokawa et al. | |
| 2013/0330623 | A1* | 12/2013 | Matsushita | H01M 4/485 429/231.95 |
| 2014/0356695 | A1* | 12/2014 | Abe | H01M 50/46 429/223 |
| 2015/0070024 | A1* | 3/2015 | Kim | G01R 31/3679 324/430 |
| 2016/0041230 | A1* | 2/2016 | Yen | G06F 1/26 320/136 |

FOREIGN PATENT DOCUMENTS

| | | | |
|---|---|---|---|
| KR | 10-2012-0028350 | A | 3/2012 |
| KR | 10-2013-0086563 | A | 8/2013 |
| KR | 10-2015-0016442 | A | 2/2015 |
| WO | WO 2015/016427 | A1 | 2/2015 |

* cited by examiner

BATTERY PACK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This application is a reissue of U.S. Pat. No. 10,298,030 B2, issued on May 21, 2019.* Korean Patent Application No. 10-2015-0102402, filed on Jul. 20, 2015, and entitled, "Battery Pack," is incorporated by reference herein in its entirety.

BACKGROUND

1. Field

One or more embodiments described herein relate to a battery pack.

2. Description of the Related Art

A variety of devices are powered by batteries. Examples include mobile phones, digital cameras, laptop computers, and electric vehicles. The batteries may be incorporated into a battery pack equipped with a protective circuit for controlling charging and discharging operations.

The batteries in a battery pack may be charged by a constant current-constant voltage (CC-CV) charging method, in which CC charging is performed and then CV charging is performed. During CC charging, if the charging current and CC charging period are increased, the charging time period may be reduced. However, if charging is performed by charging current that exceeds a safe level, or if the battery is charged when the voltage of any of the batteries in the pack is equal to or greater than a predetermined voltage value, the battery pack may degrade at a more rapid rate. Thus, the charging device for the battery pack may determine whether a predetermined voltage value has been reached based on the magnitude of the voltage between the terminals of a battery pack.

However, the voltage between the terminals of the battery pack may be greater than the voltage of one or more of the batteries in the pack. In addition, the charging mode may be switched from the CC charging to the CV charging before the battery voltage reaches the predetermined voltage value. As a result, the charging time period may increase.

SUMMARY

In accordance with one or more embodiments, a battery pack includes a battery including at least one battery cell, a first battery terminal and a second battery terminal; a terminal unit including a first pack terminal, a second pack terminal, and a first sensing terminal; a first current path including charging and discharging switches to control charging and discharging of the battery, the first current path between the first battery terminal and the first pack terminal, a charging current and a discharging current of the battery to flow on the first current path; a second current path between the second battery terminal and the second pack terminal; and a first voltage sensing path including the first sensing terminal, wherein voltage between the first sensing terminal and another terminal corresponds to a voltage between the first battery terminal and the first sensing terminal. The another terminal may be the second pack terminal.

The battery pack may include a first resistor on the first voltage sensing path between the first battery terminal and the first sensing terminal. The terminal unit may include a second sensing terminal, and the battery pack may include a second voltage sensing path including the second sensing terminal. The another terminal may correspond to the second sensing terminal. The battery pack may include a second resistor on the second voltage sensing path between the second battery terminal and the second sensing terminal.

The battery pack may include a printed circuit board including a first wiring pattern, a second wire pattern, a third wire pattern, and a fourth wire pattern, wherein: the first wiring pattern may include at least a portion of the first current path, the second wiring pattern may include at least a portion of the second current path, the third wiring pattern may include at least a portion of the first voltage sensing path, and the fourth wiring pattern may include at least a portion of the second voltage sensing path.

The first wiring pattern may be on a first surface of the printed circuit board, the second wiring pattern may be on a second surface of the printed circuit board and overlaps the first wiring pattern, the third wiring pattern may be on the first surface of the printed circuit board adjacent to the first wiring pattern, and the fourth wiring pattern may be on the second surface of the printed circuit board adjacent to the second wiring pattern. The third wiring pattern may have a width less than a width of the first wiring pattern, and the fourth wiring pattern may have a width less than a width of the second wiring pattern.

The battery pack may have a protective circuit to sense a pack terminal voltage between the first and second pack terminals and to control the charging and discharging switches based on a voltage between the first and second pack terminals The battery pack may include a fuse on the first current path and may be connected between the first battery terminal and the charging and discharging switches, and the first voltage sensing path may be branched between the fuse and the charging and discharging switches.

In accordance with one or more other embodiments, an apparatus includes a first pack terminal connected to a first battery terminal through a first circuit path; a second pack terminal connected to a second battery terminal through a second circuit path; and a first sensing terminal connected to the first battery terminal through a third circuit path, wherein the first circuit path includes at least one switch to control a charging or discharging operation and wherein the third circuit path is connected to the first circuit path and bypasses the at least one switch, a voltage between the first sensing terminal and another terminal corresponding to a voltage between the first and second battery terminals. The another terminal may be the second pack terminal.

The second sensing terminal may be connected to the second battery terminal through a fourth circuit path, the fourth circuit path may be connected to the second current path, and the another terminal may correspond to the second sensing terminal. A voltage between the first and second pack terminals may be less than the voltage between the first sensing terminal and the another terminal. The apparatus may include a protection circuit connected to the at least one switch. The apparatus may include a fuse between the first battery terminal and the first pack terminal.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
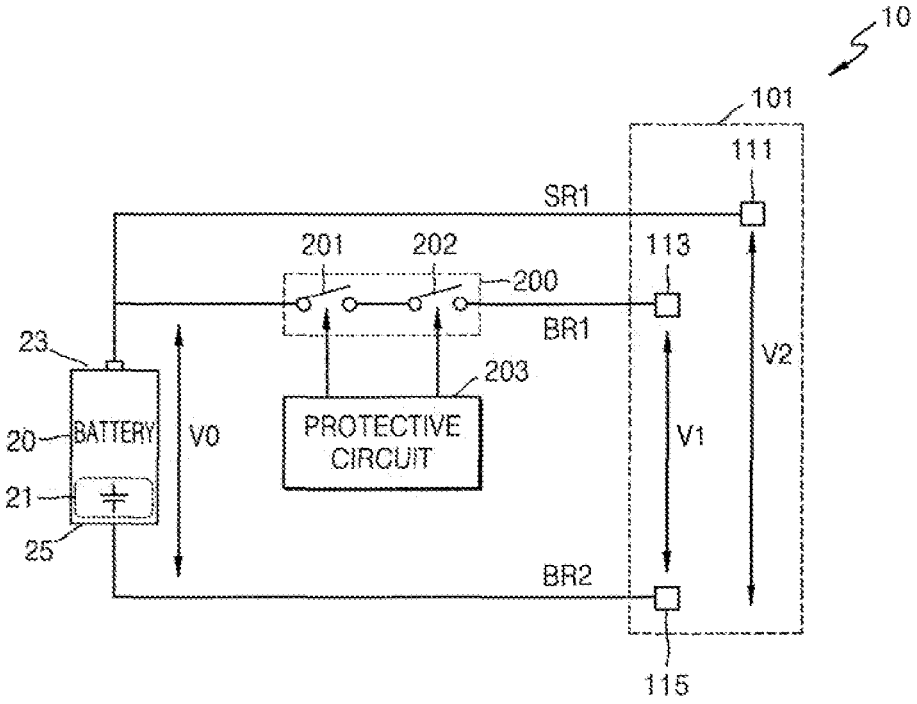
FIG. 1 illustrates an embodiment of a battery pack.

Example embodiments are described more fully hereinafter with reference to the drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of a battery pack 10 which includes a battery 20, a terminal unit 101, and a switch unit 200. The terminal unit 101 includes a first pack terminal 113, a second pack terminal 115, and a first sensing terminal 111. The battery pack 10 may further include a protective circuit 203.

The battery 20 includes a first battery terminal 23 and a second battery terminal 25 having opposite polarities. For illustrative purposes only, the first battery terminal 23 is illustrated as a positive electrode terminal and the second battery terminal 25 is illustrated as a negative electrode terminal.

The battery 20 stores electric power and includes at least one battery cell 21. When the battery 20 has a plurality of battery cells 21, the battery cells 21 may be connected in series, in parallel, or in combination thereof. The number of battery cells 21 and connecting type of the battery cells 21 in the battery 20 may be determined, for example, according to an output voltage and/or electric power storage capacity of an intended application. Each of the battery cells 21 include a secondary battery that is rechargeable, e.g., a nickel-cadmium battery, a lead battery, a nickel metal hydride (NiMH) battery, a lithium-ion battery, a lithium polymer battery, or another type of rechargeable battery.

The switch unit 200 includes a charging switch 201 and a discharging switch 202. The battery pack 10 includes a first high current path BR1, a second high current path BR2, and a first voltage sensing path SR1.

The protective circuit 203 controls the switch unit 200 in order to protect the battery 20. The protective circuit 203 may perform various operations to control flow of current on a first high current path BR1 and a second high current path BR2. For example, the protective circuit 203 may perform an over-charging protection, an over-discharging protection, an over-current protection, an overheat protection, a cell balancing function, and/or the like.

In one embodiment, the protective circuit 203 may obtain a current value, a voltage value, a temperature, a remaining power amount, a lifespan, and a state of charge (SOC) of the battery 20. For example, the protective circuit 203 may measure a cell voltage and a temperature of the battery cell 21 by using sensors. When the protective circuit 203 senses that there is an abnormal condition such as an over-charging, an over-discharging, an over-current, and/or a high temperature in the battery 20, the protective circuit 203 may protect the battery 20 by opening the charging switch 201 and/or the discharging switch 202. The protective circuit 203 may output a control signal for controlling the charging switch 201 and/or the discharging switch 202.

The switch unit 200 is on the first high current path BR1 between the first battery terminal 23 and the first pack terminal 113. The charging current and the discharging current flow along the first high current path BR1. The switch unit 200 may block the charging and discharging of the battery 20 according to the control signal. As illustrated in FIG. 1, the switch unit 200 may be connected between the first battery terminal 23 and the first pack terminal 113 of the battery 20. The discharging switch 202 and the charging switch 201 of the switch unit 20 may include, for example, transistors and/or relays.

A parasitic diode of the charging switch 201 may be disposed so that a direction in which the discharging current of the battery 20 flows (e.g., a direction from the first battery terminal 23 to the first pack terminal 113 of the battery 20) is a forward direction. When the charging switch 201 is turned off, the charging current of the battery 20 is blocked. The parasitic diode of the discharging switch 202 is disposed so that a direction in which the charging current of the battery 20 flows (e.g., a direction from the first pack terminal 113 toward the first battery terminal 23 of the first battery 20) is a forward direction. When the discharging switch 202 is turned off, the discharging current of the battery 20 is blocked.

According to another exemplary embodiment, the switch unit 200 may include a relay switch that blocks both the charging and discharging currents.

The first pack terminal 113 and the second pack terminal 115 may be electrically connected to an external device. For example, the first and second pack terminals 113 and 115 may be wiring patterns of electrodes, connectors, terminal boards, lands, and/or pads. The battery 20 may supply the current or the voltage to the external device (e.g., a load device) via the first pack terminal 113 or the second pack terminal 115. Otherwise, the external device (e.g., a charging device) may supply a charging current to the battery 20 via the first pack terminal 113 or the second pack terminal 115.

The first high current path BR1 has the first pack terminal 113 and the first battery terminal 23 at opposite ends. The second high current path BR2 has the second pack terminal 115 and the second battery terminal 25 at opposite ends. The first and second high current paths BR1 and BR2 may respectively include conducting wires, through which the charging current and the discharging current respectively flow. The first and second high current paths BR1 and BR2 have conducting wire resistors. Since the charging switch 201 and the discharging switch 202 are on the first high current path BR1, turn-on resistors of the charging switch 201 and the discharging switch 202 exist even when the charging switch 201 and the discharging switch 202 are turned on.

Referring to FIG. 1, the pack terminal voltage V1 between the first pack terminal 113 and the second pack terminal 115 may be different from the actual voltage of the battery 20. This difference may exist because of a voltage drop that occurs when the charging current and the discharging current flow on the first and second high current paths BR1 and BR2. The voltage drop may occur as a result of the resistors (e.g., the conducting wire resistors and the turn-on resistors) that exist on the first and second high current paths BR1 and BR2.

For example, during CC charging, the charging current of a few amperes (A) may flow on the first and second high current paths BR1 and BR2. The wire resistor may have a resistance value of a few mΩ and the turn-on resistor may have a resistance value of tens of mΩ. The magnitude of the pack terminal voltage V1 between the first pack terminal 113 and the second pack terminal 115 may be greater than a magnitude of a battery terminal voltage V0 of the battery 20 by about hundreds of mV.

The first sensing terminal 111 may be disposed so that the first voltage sensing path SR1 may be the shortest path. The first sensing terminal 111 may be adjacent to the first pack terminal 113. The first sensing terminal 111 may provide a more accurate basis for allowing the battery terminal voltage V0 between the first and second battery terminals 23 and 25 to be determined by an external device. In this case, the first sensing terminal 111 may be electrically connected to the external device. In this case, the external device may sense a voltage V2 between the first sensing terminal 111 and the second pack terminal 115.

The first voltage sensing path SR1 has the first battery terminal 23 and the first sensing terminal 111 at opposite ends. The first voltage sensing path SR1 may include a wire for transmitting the voltage of the first battery terminal 23 to the first sensing terminal 111. Since the first voltage sensing path SR1 only transmits the voltage of the first battery terminal 23 to the first sensing terminal 111, a fine current that may be negligible only flows on the first voltage sensing path SR1. The fine current only may flow on the first voltage sensing path SR1 even when the wire resistor of a few mΩ exists on the first voltage sensing path SR1. As a result, the voltage drop occurring on the first voltage sensing path SR1 may be negligible.

As illustrated in FIG. 1, a switch may not be on the second high current path BR2. As a result, the second high current path BR2 may have a lower resistance value than the first high current path BR1. Therefore, even when the charging current and the discharging current flow, the magnitude of the dropped voltage in the second high current path BR2 is smaller than that of the first high current path BR1.

Thus, according to the present exemplary embodiment, the first sensing terminal 111 and the second pack terminal 115 may provide the voltage V2 that is approximately the battery terminal voltage V0 between the first and second battery terminals 23 and 25. The voltage V2 between the first sensing terminal 111 and the second pack terminal 115 is closer to the actual voltage of the battery 20, that is, the battery terminal voltage V0 between the first and second battery terminals 23 and 25, than the voltage V1 between the first and second pack terminals 113 and 115 is.

Figure 2:
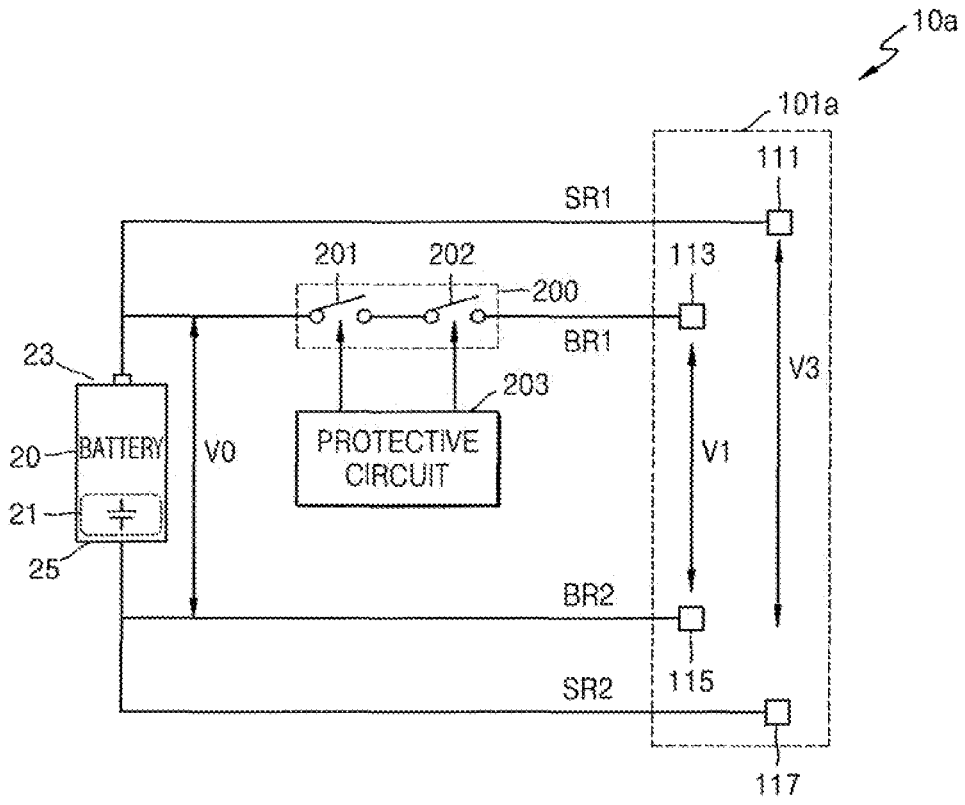
FIG. 2 illustrates another embodiment of a battery pack.

FIG. 2 illustrates another embodiment of a battery pack 10a which includes the battery 20, a terminal unit 101a, and the switch unit 200. The battery 20 and the switch unit 200 may be the same as those of FIG. 1.

The terminal unit 101a includes the first pack terminal 113, the second pack terminal 115, the first sensing terminal 111, and a second sensing terminal 117. The first pack terminal 113, the second pack terminal 115, and the first sensing terminal 111 may be the same as in FIG. 1.

The second sensing terminal 117 may be disposed so that the second voltage sensing path SR2 is the shortest path. The second sensing terminal 117 may be adjacent to the second pack terminal 115. The first sensing terminal 111 and the second sensing terminal 117 may be connected to an external device, and may provide a sensing terminal voltage V3 that is substantially equal to the battery terminal voltage V0 between the first and second battery terminals 23 and 25 to the external device.

The second voltage sensing path SR2 is a path having the second battery terminal 25 and the second sensing terminal 117 at opposite ends. The second voltage sensing path SR2 may include a wire for transmitting the voltage of the second battery terminal 25 to the second sensing terminal 117. Like as described above with reference to FIG. 1, only a fine current may flow on the second voltage sensing path SR2 like the first voltage sensing path SR1. Thus, a voltage drop on the second voltage sensing path SR2 may be negligible.

According to the present exemplary embodiment, the second sensing terminal 117 and the first sensing terminal 111 provide the sensing terminal voltage V3 which is a more accurate indication of (e.g., is substantially equal to) the battery terminal voltage V0 between the first and second battery terminals 23 and 25. Since the voltage drop on the first and second voltage sensing paths SR1 and SR2 is considered to be negligible, the sensing terminal voltage V3 between the first and second sensing terminals 111 and 117 has a magnitude that is substantially equal to that of the battery terminal voltage V0 between the first and second battery terminals 23 and 25.

In addition, a charging device may increase the magnitude of the charging current in order to rapidly charge the battery 20. Even though the magnitude of the charging current is increased, the magnitude of the current flowing on the first and second voltage sensing paths SR1 and SR2 does not change. Thus, the first sensing terminal 111 and the second sensing terminal 117 provide the sensing terminal voltage V3, that is a more accurate indication of (e.g., is substantially equal to) the battery terminal voltage V0 of the actual battery 20, without being affected by a variation in magnitude of the charging current.

The pack terminal voltage V1 between the first pack terminal 113 and the second pack terminal 115 may be different from the battery terminal voltage V0 of the battery 20, for example, by about hundreds of mV, due to the voltage drop on the first and second high current paths BR1 and BR2. If the magnitude of the charging current is increased to allow for rapid charging, the magnitude of the current flowing on the first and second high current paths BR1 and BR2 increases. Accordingly, the dropped voltage also increases. The difference of the pack terminal voltage V1 between the first and second pack terminals 113 and 115 from the battery terminal voltage V0 of the battery 20 increases as the magnitude of the charging current increases.

Figure 3:
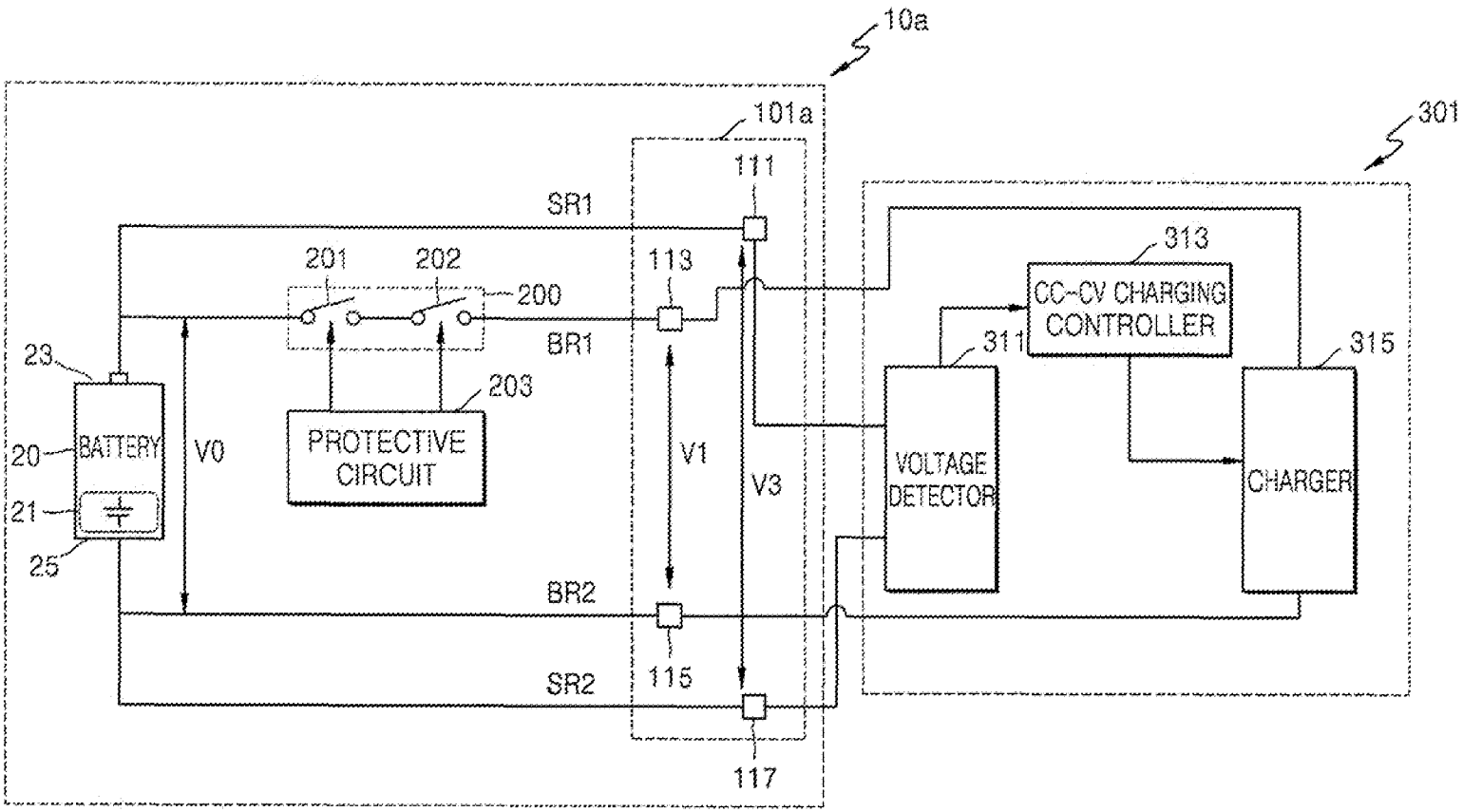
FIG. 3 illustrates another embodiment of a battery pack.

FIG. 3 illustrates an embodiment of a charging device 301 connected to the battery pack 10a. Referring to FIG. 3, the charging device 301 includes a voltage detector 311, a CC-CV charging controller 313, and a charger 315. The charging device 301 may charge the battery pack 10a using external power. The charging device 301 may be connected to the battery pack 10a via the first and second pack terminals 113 and 115 and the first and second sensing terminals 111 and 117.

The charger 315 outputs CC and CV to convert the external power. The charger 315 may output the CC or the CV according to a control signal from the CC-CV charging controller 313. The charger 315 supplies the CC and the CV to the battery pack 10a via the first pack terminal 113 and the second pack terminal 115.

The voltage detector 311 detects a sensing terminal voltage V3 between the first sensing terminal 111 and the second sensing terminal 117, and provides voltage information corresponding to the detected sensing terminal voltage V3 to the CC-CV charging controller 313.

The CC-CV charging controller 313 may determine a charging mode of the charging device 301 as one of the CC charging mode or the CV charging mode based on the sensing terminal voltage V3 detected by the voltage detector 311.

In the CC charging mode, the charger 315 supplies the CC to the battery pack 10a according to control of the CC-CV charging controller 313. The battery pack 10a is charged by the CC supplied from the charger 315 and, as a result, the level of the battery terminal voltage V0 of the battery 20 rises gradually. The voltage detector 311 detects the sensing terminal voltage V3 between the first and second sensing terminals 111 and 117 of the battery pack 10a. As described above, the level of the sensing terminal voltage V3 between the first and second sensing terminals 111 and 117 is substantially equal to the level of battery terminal voltage V0 of the battery 20. When the level of the sensing terminal voltage V3 of the battery pack 10a, as detected by the voltage detector 311, reaches a predetermined mode switching voltage, the CC-CV charging controller 313 may switch the charging mode from the CC charging mode to the CV charging mode.

In the CV charging mode, the charger 315 supplies the CV to the battery pack 10a according to control of the CC-CV charging controller 313. The battery pack 10a is charged by the CV supplied from the charger 315 and, as a result, the level of the battery terminal voltage V0 of the battery 20 rises to the level of the CV supplied from the charger 315. Since the voltage level of the battery terminal voltage V0 in the battery 20 rises, the charging current applied to the battery 20 is gradually reduced. When the voltage level of the battery terminal level V0 in the battery 20 is substantially equal to the level of the CV supplied by the charger 315, the charging current applied to the battery 20 becomes 0. When the current output from the charger 315 is substantially 0, charging of the battery pack 10a may be considered to be finished and the CC-CV charging controller 313 may end the charging operation.

If switching between the CC charging mode and the CV charging mode is determined based on the pack terminal voltage V1 between the first and second pack terminals 113 and 115, the CC charging section may be reduced and the total charging time period may increase. As described above, the charging current and the discharging current of a considerably large magnitude flow on the first and second high current paths BR1 and BR2, as well as through the resistors of a considerably large magnitude, e.g., the wire resistor and the turn-on resistor of the switch. Therefore, there is a large difference between the pack terminal voltage V1 between the first and second pack terminals 113 and 115 and the battery terminal voltage V0. For example, in the charging mode, the pack terminal voltage V1 may be greater than the battery terminal voltage V0 on the order of hundreds of mV. Therefore, even if the pack terminal voltage V1 reaches the mode switching voltage, the actual battery terminal voltage V0 does not reach the mode switching voltage. Thus, the charging mode is switched to the CV charging mode even though the battery pack 10a may still be charged in the CC charging mode. Then, the CC charging section is reduced.

According to experimental results, when the voltage detector 311 measures the pack terminal voltage V1 between the first pack terminal 113 and the second pack terminal 115, the charging time period until the state of charge (SOC) of the battery reaches 80% was 67.77 minutes on average. Based on the sensing terminal voltage V3 between the first and second sensing terminals 111 and 117, the charging time period until the SOC of the battery reaches 80% was 52.49 minutes on average. Thus, it was 15.28 minutes faster to determine whether the CC charging mode was finished based on the sensing terminal voltage V3 between the first and second sensing terminals 111 and 117, than to determine whether the CC charging mode was finished based on the pack terminal voltage V1 between the first and second pack terminals 113 and 115. Therefore, in this example, the battery pack 10a including the first and second sensing terminals 111 and 117 may reduce the charging time period by about 22.54%. A different period reduction may be achieved in another embodiment.

Figure 4:
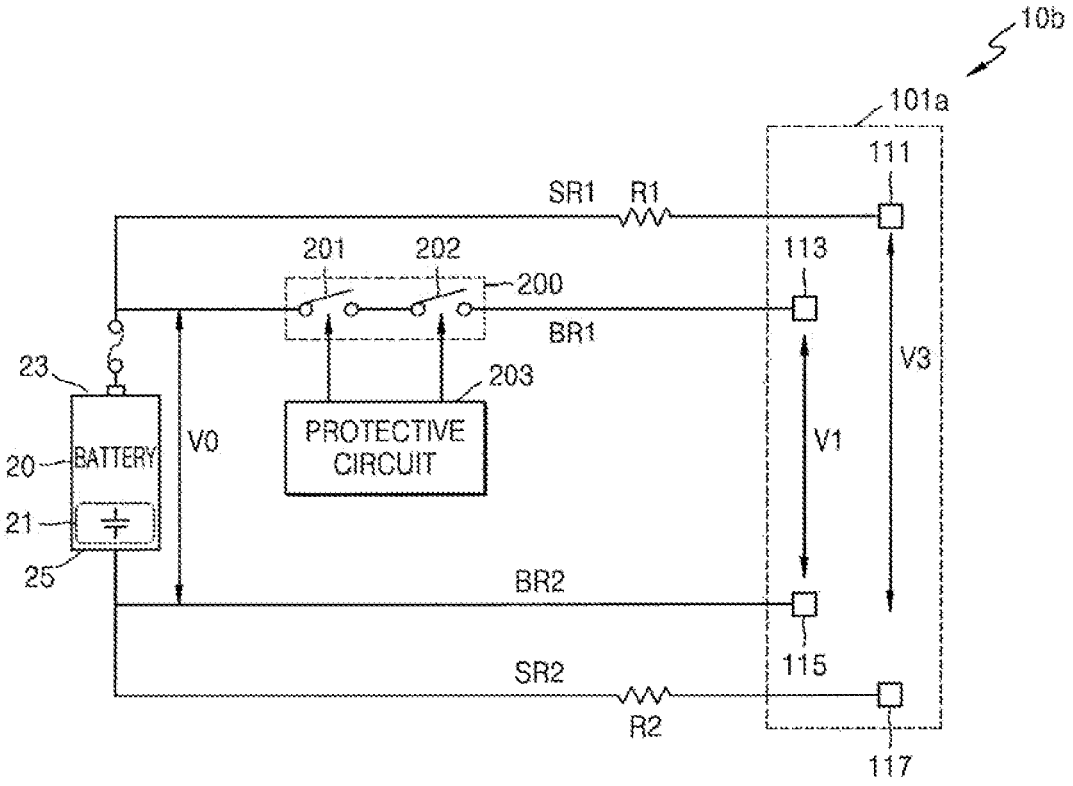
FIG. 4 illustrates a battery pack connected to a charging device.

FIG. 4 illustrates another embodiment of a battery pack 10b which includes the battery 20, the terminal unit 101a, the protective circuit 203, and the switch unit 200. The battery 20, the protective circuit 203, the switch unit 200, and the terminal unit 101a may respectively correspond to the battery 20, the protective circuit 203, the switch unit 200, and the terminal 101a in FIG. 2.

Referring to FIG. 4, a first resistor R1 is connected between the first sensing terminal 111 and the first battery terminal 23. A second resistor R2 is connected between the second sensing terminal 117 and the second battery terminal 25. These resistors restrict the magnitude of current flowing on the first and second voltage sensing paths SR1 and SR2 to a predetermined range, if there is short-circuit between the terminals of the terminal unit 101a.

According to an exemplary embodiment, the first resistor R1 is on the first voltage sensing path SR1 and the second resistor R2 is on the second voltage sensing path SR2. If there is a short-circuit between the first sensing terminal 111 and the second pack terminal 115 or the second sensing terminal 117, a short-circuit current flows on the first voltage sensing path SR1. The first resistor R1 may restrict the magnitude of the short-circuit current generated due to the short-circuit between terminals within a predetermined range. The second resistor R2 may be on the second voltage sensing path SR2 to deal with a case in which there is a short-circuit between the second sensing terminal 117 and another terminal. Resistance values of the first and second resistors R1 and R2 may be determined, for example, so that the battery 20 is not damaged from current generated by the short-circuit between the terminals.

According to another exemplary embodiment, a fuse is disposed between the first battery terminal 23 and a branch between the first voltage sensing path SR1 and the first high current path BR2. If the short-circuit current flows on the first or second voltage sensing path SR1 or SR2 due to the short-circuit between terminals, the fuse 400 may block the high current path when the short-circuit current of a predetermined magnitude or greater flows so as to reduce damage to the battery 20.

Figure 5A:
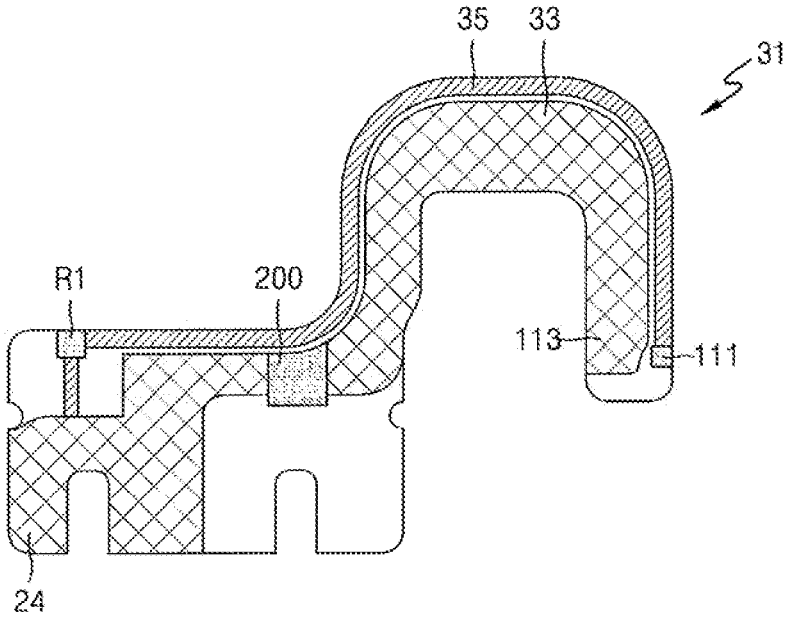
FIGS. 5A and 5B illustrate examples of a pattern of a printed circuit board in a battery pack.

FIG. 5A illustrates an example of a pattern of a printed circuit board 31 in the battery pack 10a. Referring to FIG. 5A, the battery pack 10a includes the printed circuit board 31. A first wiring pattern 33 providing the first high current path BR1 and a third wiring pattern 35 providing the first voltage sensing path SR1 are on a first surface of the printed circuit board 31. The third wiring pattern 35 is adjacent to and insulated from the first wiring pattern 33. Since the charging and discharging currents do not flow on the third wiring pattern 35, the third wiring pattern 35 may have a width less than the first wiring pattern 33 and may disposed on the first surface of the printed circuit board 31.

According to an exemplary embodiment, the first terminal pad 24 directly contacts a first battery terminal. Since the first terminal pad 24 directly contacts the first battery terminal, transmission of distortion of the voltage of the first battery terminal may be reduced. The switch unit 200 may be disposed on the first wiring pattern 33. The switch unit 200 is turned on and off according to the control signal of the protective circuit 203 as described above with reference to FIG. 1. The first resistor R1 may be on the third wiring pattern 35. As described above with reference to FIG. 4, the first resistor R1 may restrict short-circuit current flowing on the third wiring pattern 35 when the patterns are short-circuited.

According to another exemplary embodiment, the first wiring pattern 33 may include a fuse connected between the first battery terminal 23 and the switch unit 200, with the third wiring pattern 35 branched between the fuse and the switch unit 200. The fuse blocks high current paths when the short-circuit current of a predetermined magnitude or greater flows, thereby reducing or preventing damage to the battery 20.

Figure 5B:
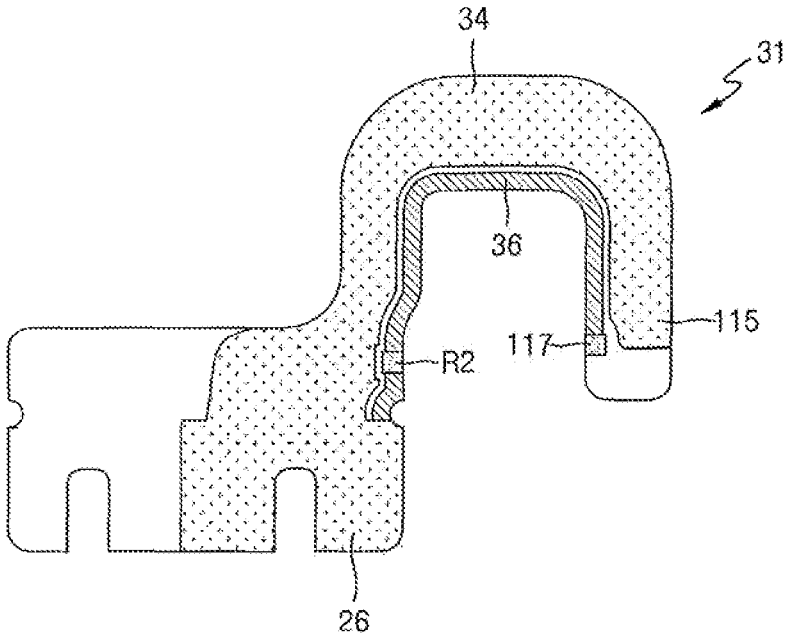

FIG. 5B illustrates another example of a pattern on the printed circuit board 31 in the battery pack. Referring to FIG. 5B, a second wiring pattern 34 providing the second high current path BR2 and a fourth wiring pattern 36 providing the second voltage sensing path SR2 are on the second surface of the printed circuit board 31. The fourth wiring pattern 36 is adjacent and insulated from the second wiring pattern 34.

The second wiring pattern 34 may be on the second surface of the printed circuit board 31 and may overlap the first wiring pattern 33. Since the charging and discharging currents do not flow on the fourth wiring pattern 36, the fourth wiring pattern 36 may have a width that is less than that of the second wiring pattern 34 and may be disposed on the second surface of the printed circuit board 31.

According to the exemplary embodiment, the second terminal pad 26 directly contacts a second battery terminal. Since the second terminal pad 26 directly contacts the second battery terminal, transmission of distortion of the voltage of the second battery terminal may be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A battery pack, comprising:

a battery including at least one battery cell, a first battery terminal, and a second battery terminal;

a terminal unit including a first pack terminal, a second pack terminal, and a first sensing terminal;

a first current path between the first battery terminal and the first pack terminal, the first current path including [charging and discharging switches] *at least one switch* to control [charging and discharging] *a charging or discharging operation* of the battery*, wherein the first current path includes a first wiring pattern having a curved side*;

a second current path between the second battery terminal and the second pack terminal; and a first voltage sensing path between the first battery terminal and the first sensing terminal, *wherein the first voltage sensing path includes a second wiring pattern adjacent to the first wiring pattern and being curved along the curved side of the first wiring pattern,* wherein the first sensing terminal and the second pack terminal output a battery terminal voltage between the first and second battery terminals to an external device even though the [charging and discharging switches are] *at least one switch is* turned off, and wherein the external device is external to the battery pack and directly connected to the first pack terminal, the second pack terminal, and the first sensing terminal.

2. The battery pack as claimed in claim 1, further comprising:

a first resistor on the first voltage sensing path between the first battery terminal and the first sensing terminal.

3. The battery pack as claimed in claim 1, wherein:

the terminal unit includes a second sensing terminal, and the battery pack includes a second voltage sensing path between the second battery terminal and the second sensing terminal.

4. The battery pack as claimed in claim 3, wherein the first and second sensing terminals output the battery terminal voltage to the external device even though the [charging and discharging switches are] *at least one switch is* turned off.

5. The battery pack as claimed in claim 3, further comprising:

a second resistor on the second voltage sensing path between the second battery terminal and the second sensing terminal.

6. The battery pack as claimed in claim 3, further comprising:

a printed circuit board including [a] *the* first wiring pattern, [a] *the* second [wire] *wiring* pattern, a third [wire] *wiring* pattern, and a fourth [wire] *wiring* pattern, wherein:

the first wiring pattern includes at least a portion of the first current path, the second wiring pattern includes at least a portion of the second current path, the third wiring pattern includes at least a portion of the first voltage sensing path, and the fourth wiring pattern includes at least a portion of the second voltage sensing path.

7. The battery pack as claimed in claim 6, wherein:

the first wiring pattern is on a first surface of the printed circuit board, the second wiring pattern is on a second surface of the printed circuit board and overlaps the first wiring pattern, the third wiring pattern is on the first surface of the printed circuit board adjacent to the first wiring pattern, and the fourth wiring pattern is on the second surface of the printed circuit board adjacent to the second wiring pattern.

8. The battery pack as claimed in claim 6, wherein the third wiring pattern has a width less than a width of the first wiring pattern, and the fourth wiring pattern has a width less than a width of the second wiring pattern.

9. The battery pack as claimed in claim 1, further comprising:

a protective circuit to sense a pack terminal voltage between the first and second pack terminals and to control the [charging and discharging switches] *at least one switch* based on the pack terminal voltage between the first and second pack terminals.

10. The battery pack as claimed in claim 1, further comprising:

a fuse on the first current path and connected between the first battery terminal and the [charging and discharging switches] *at least one switch*, wherein the first sensing terminal is electrically connected to the first battery terminal through the fuse.

11. An apparatus, comprising:

*a battery pack, comprising:* a battery including a first battery terminal and a second battery terminal;

a first pack terminal connected to the first battery terminal through a first circuit path;

a second pack terminal connected to the second battery terminal through a second circuit path; [and]

a first sensing terminal connected to the first battery terminal through a third circuit path[.]*; and*

*a protective circuit to sense a pack terminal voltage between the first and second pack terminals and to control a charging switch and a discharging switch based on the pack terminal voltage between the first and second pack terminals,* wherein the first circuit path includes [at least one] *the charging* switch *and the discharging switch* to control a charging [or] *operation and a* discharging operation, *respectively,* wherein [the first sensing terminal and the second pack terminal output] *an external device receives* a battery terminal voltage between the first and second battery terminals [to an external device] *through the first sensing terminal and the second pack terminal* even though the [at least one switch is] *charging switch and the discharging switch are* turned off, [and] wherein the external device is external to the apparatus and electrically connected to the apparatus through the first pack terminal, the second pack terminal, and the first sensing terminal*, and wherein*

*the battery pack further comprises a fuse between the first battery terminal and the charging switch and the discharging switch, wherein the first sensing terminal is electrically connected to the first battery terminal through the fuse.*

12. The apparatus as claimed in claim 11, *wherein the battery pack* further [comprising:] *comprises* a second sensing terminal connected to the second battery terminal through a fourth circuit path,

[wherein the fourth circuit path is connected to the second circuit path and] wherein [the first and second sensing terminals output] *the external device receives* the battery terminal voltage *through the first and second sensing terminals* to the external device even though the [at least one switch is] *charging switch and the discharging switch are* turned off.

13. The apparatus as claimed in claim 11, wherein *the external device is configured to sense the battery terminal voltage different from* a voltage between the first and second pack terminals [is different from voltage between the first sensing terminal and the second pack terminal due to the at least one switch].

14. The apparatus as claimed in claim 11, *wherein the battery pack* further [comprising:] *comprises* a protection circuit connected to the [at least one] *charging switch and the discharging* switch.

[15. The apparatus as claimed in claim 11, further comprising:

a fuse between the first battery terminal and the at least one switch, wherein the first sensing terminal is electrically connected to the first battery terminal through the fuse.]

[16. The battery pack as claimed in claim 1, wherein:

the first current path includes a first wiring pattern having a curved side, and the first voltage sensing path includes a second wire pattern being adjacent to the first wiring pattern and being curved along the curved side of the first wiring pattern.]

17. [A] *An apparatus, comprising:*

*a* battery pack, comprising:

a battery including a first battery terminal and a second battery terminal;

[charging and discharging switches] *a charging switch and a discharging switch* to control [charging and discharging] *a charging operation and a discharging operation, respectively,* of the battery;

a first pack terminal electrically connected to the first battery terminal through the charging [and discharging switches] *switch and the discharging switch*;

a second pack terminal electrically connected to the second battery terminal; [and]

a first sensing terminal electrically connected to the first battery terminal without passing through the charging *switch* and discharging [switches,] *switch; and*

*a protective circuit to sense a pack terminal voltage between the first and second pack terminals and to control the charging switch and the discharging switch based on the pack terminal voltage between the first and second pack terminals,*

*a fuse between the first battery terminal and the charging and discharging switches, wherein the first sensing terminal is electrically connected to the first battery terminal through the fuse,* wherein the first sensing terminal and the second pack terminal output a battery terminal voltage between the first and second battery terminals to an external device even though the charging [and discharging switches] *switch and the discharging switch* are turned off, and wherein the external device is external to the battery pack and directly connected to the first pack terminal, the second pack terminal, and the first sensing terminal.

18. The [battery pack] *apparatus* as claimed in claim 17, *wherein the battery pack* further [comprising:] *comprises* a first resistor between the first battery terminal and the first sensing terminal.

19. The [battery pack] *apparatus* as claimed in claim 17, *wherein the battery pack* further [comprising:] *comprises* a second sensing terminal electrically connected to the second battery terminal, wherein the first and second sensing terminals output the battery terminal voltage to the [external] *electric* device even though the charging *switch* and *the* discharging [switches] *switch* are turned off.

20. The [battery pack] *apparatus* as claimed in claim 19, *wherein the battery pack* further [comprising:] *comprises* a second resistor between the second battery terminal and the second sensing terminal.

*21. The battery pack as claimed in claim 1, wherein:*

*the first battery terminal is a positive electrode terminal of the battery, and*

*the second battery terminal is a negative electrode terminal of the battery.*

*22. The battery pack as claimed in claim 1, wherein:*

*the first battery terminal is a negative electrode terminal of the battery, and*

*the second battery terminal is a positive electrode terminal of the battery.*

*23. The apparatus as claimed in claim 11, wherein:*

*the first battery terminal is one of a positive electrode terminal and a negative electrode terminal of the battery, and*

*the second battery terminal is the other of the positive electrode terminal and the negative electrode terminal of the battery.*

*24. The apparatus as claimed in claim 17, wherein the external device is configured to sense the battery terminal voltage through the first sensing terminal and the second pack terminal.*

*25. The apparatus as claimed in claim 19, wherein the external device is configured to sense the battery terminal voltage through the first and second sensing terminals.*

* * * * *